United States Patent
Mandelbaum

[11] 3,731,403
[45] May 8, 1973

[54] PROGRAMMED TEACHING DEVICE

[76] Inventor: Arye L. Mandelbaum, 8 Weitzbard St., Rishon-Le-Zion, Israel

[22] Filed: June 19, 1972

[21] Appl. No.: 264,270

[30] Foreign Application Priority Data

June 29, 1971 Israel ..................................... 37179

[52] U.S. Cl. ..................................... 35/48 R, 35/9 B
[51] Int. Cl. ................................................ G09b 7/06
[58] Field of Search ...................... 35/48 R, 9 R, 9 A, 35/9 B

[56] References Cited

UNITED STATES PATENTS

| | | | |
|---|---|---|---|
| 3,199,230 | 8/1965 | Sylvester et al. | 35/48 R |
| 3,300,876 | 1/1967 | Johannsen | 35/48 R X |
| 3,332,157 | 7/1967 | Kirkconnell et al. | 35/48 R |

FOREIGN PATENTS OR APPLICATIONS 1,189,642    4/1970    Great Britain ......................... 35/9 R

*Primary Examiner*—Wm. H. Grieb
*Attorney*—Benjamin J. Barish

[57] ABSTRACT

A programmed teaching apparatus for use with a slide projector for teaching a group of students, comprises a magazine for holding a plurality of slides each containing a question and multiple-choice answers, an answer selector for each student, a control panel having a student answer display for each student, a correct answer display on the control panel viewable only by the instructor, and a program plate attached to the slide magazine so as to be automatically advanced with it. The program plate includes a field for each slide recorded in accordance with the correct multiple-choice answers of the respective slide. A second correct answer display is provided so as to be viewable by the students, and a switch under the control of the instructor selectively connects the latter display to the instructor's correct answer display.

7 Claims, 4 Drawing Figures

PATENTED MAY 8 1973
3,731,403
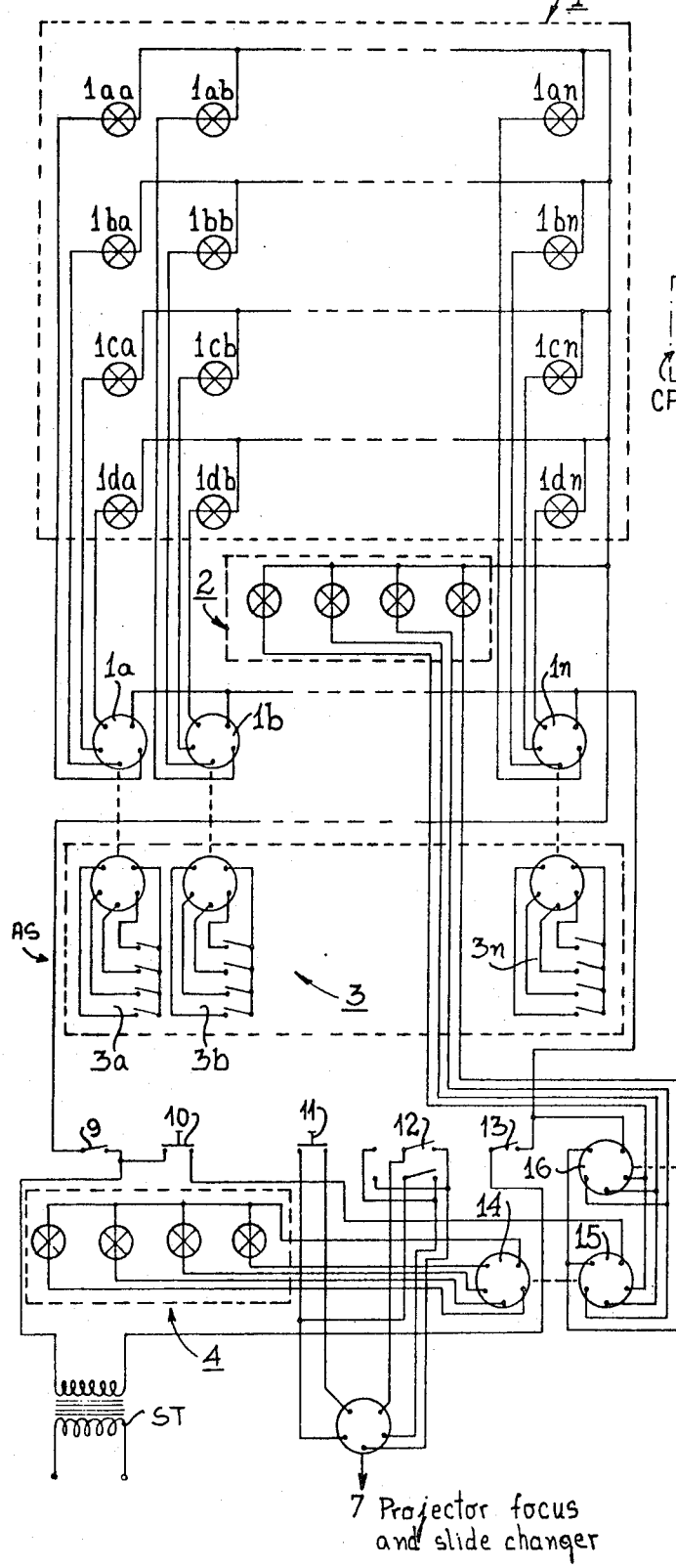
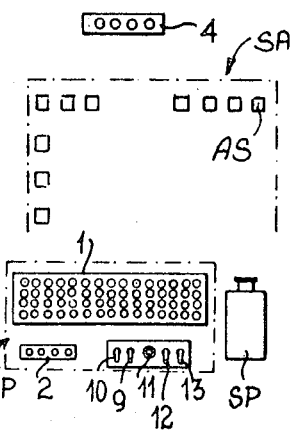
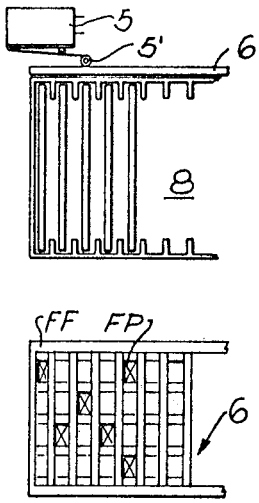
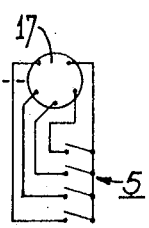

PROGRAMMED TEACHING DEVICE

BACKGROUND OF THE INVENTION

The present invention relates to programmed teaching apparatus, and particularly to such apparatus for use in teaching a group of students at one time.

Programmed teaching devices are now widely used for presenting to the students the material to be studied in accordance with a predetermined sequence, and for testing the rate of progress of the student. Most programmed teaching devices now available are designed for use by individuals alone. Group teaching machines, however, have been proposed for teaching groups of students at one time. An example of a group teaching machine is disclosed in British Pat. No. 1,189,642. As a rule, the known group teaching machines are very complicated and therefore costly to produce.

SUMMARY OF THE INVENTION

An object of the present invention is to provide group teaching apparatus which is relatively simple in construction as compared to those already known, and which therefore can be produced at low cost.

The invention provides programmed teaching apparatus for use with a slide projector for teaching a group of students at one time. It comprises a magazine for holding a plurality of slides in a predetermined sequence, each slide containing a question and a plurality of multiple-choice answers; a plurality of answer selectors one for each student and each manually operatable by the student to indicate his selected answer to the question displayed; a control panel including a plurality of student answer displays, one for each student and displaying to the instructor the answers selected by the respective students; a correct answer display disposed on the control panel so as to be viewable only by the instructor; a switching device controlling the correct answer display; and a program plate attached to the magazine so as to be automatically advanced therewith. The program plate includes a field for each slide with each field including a plurality of areas recorded in accordance with the correct ones of the multiple-choice answers of the respective slides. The advancement of the magazine thus controls the switching device to cause the correct answer display to automatically display the correct answer of each slide as it is projected.

In the preferred embodiment of the invention described below, the control panel further includes a slide-changing manual switch operable by the instructor to advance the slide projector.

According to a further feature, the apparatus also includes a second correct answer display viewable by the group of students, and a further manual switch on the control panel actuatable by the instructor to selectively connect or disconnect the student correct answer display with respect to the instructor correct answer display.

The advantage of such a construction, as well as further features thereof, will be apparent from the description below.

BRIEF DESCRIPTION OF DRAWINGS

The invention is herein described, somewhat diagrammatically and by way of example only, with reference to the accompanying drawings, wherein:

FIG. 1 is a general layout of one form of programmed teaching apparatus constructed in accordance with the invention;

FIG. 2 is a circuit diagram of the apparatus of FIG. 1;

FIG. 3 illustrates a slide magazine having attached thereto a program plate in accordance with the invention; and FIG. 4 is a top plan view of the program plate of FIG. 3.

DESCRIPTION OF THE PREFERRED EMBODIMENT

The apparatus illustrated in the drawings is for use with a slide projector SP (FIG. 1) which projects a plurality of slides in a predetermined sequence, each slide containing a question and multiple-choice answers. The apparatus is controlled by an operator sitting adjacent to the control panel CP. For purposes of example, it is illustrated for use with up to fifteen students sitting in the student area SA, and with slides which contain up to four multiple-choice answers for each question, each student having an answer selector AS for selecting what he thinks is the correct answer.

There are three indicator lamp displays in the apparatus illustrated, as follows:

The first display, generally designated by the reference numeral 1, is located on the control panel CP (FIG. 1) of the apparatus so as to be viewable only by the instructor. Its function is to display to the instructor the answers selected by each of the students to the questions projected by the slide. Thus, the student answer display 1 contains fifteen vertical columns of indicator lamps, one column for each of the fifteen students in the group. Each column includes four lamps, $1aa$–$da$, $1ab$–$db$–$1an$–$dn$ (FIG. 2), one for each of the four multiple-choice answers of the respective slide.

The second display, generally designated by the reference numeral 2, includes only four indicator lamps. This display is also disposed on the control panel CP so as to be viewable only by the instructor. Its function is to display the correct one of the multiple-choice answers to the question projected by the respective slide.

The third display, generally designated by the reference numeral 4, also serves to display the correct answer to each multiple-choice question projected by the slide. Display 4, however, is disposed in a separate unit viewable by the complete group of students using the apparatus. As will be more clearly described below, display 4 is not actuated until the students have had an opportunity to select and indicate their respective answers to the question projected by the slide.

The answer selectors AS are in the form of selector switches 3 (FIG. 2) manually operatable by the student. There is a selector switch for each of the students in the group, and each selector switch enables the student to make up to four selections. Thus, there are fifteen selector switches $3a$–$3n$ in the machine illustrated, each selector switch having four individually-actuatable contacts for making one of the four selections.

The apparatus further includes a microswitch unit 5 containing four microswitches. These microswitches are actuatable by a program plate 6 which is fixed to the top of the magazine 8 (FIG. 3) containing the slides to be projected in accordance with a predetermined sequence.

Program plate 6 (FIG. 4) includes a plurality of fields, one for each of the slides within the magazine. Each field (shown as vertically-extending strips FF in the drawings) is divided into four areas, one for each of the multiple-choice answers. The correct answer for the respective slide is indicated by forming a hole or perforations FP in the respective area of the field, the remaining three areas of the field being non-perforated.

As shown in FIG. 3, program plate 6 is fixed to the top of the slide magazine 8 with the above-described fields of the program plate aligned with their respective slides in the magazine. Thus, program plate 6 will be advanced step-by-step with the advancement of the slide magazine to project the slides in accordance with the sequence determined by their positions within the magazine.

The four microswitches 5 are controlled by the program plate 6 so that as the program plate advances with the change of each slide, the microswitches are automatically actuated to indicate the correct answer in the respective slide being projected. For this purpose, the four microswitches 5 include operator arms 5' which overlie the four areas of the program plate 6. These operator arms sense or feel the presence or absence of a hole FP in their respective areas of the field in the program plate.

The arrangement is such that as program plate 6 is advanced with the advancement of the slide magazine 8, there will be actuated the one microswitch 5 whose operator arm overlies the hole in the respective field of program plate 6 which designates the correct answer to the question being projected, while the remaining three microswitches will not be actuated.

Microswitches 5 are connected to the instructor correct answer display 2 on the control panel CP which is viewable only by the instructor. Thus, the instructor and only the instructor can see the correct answers displayed by lamps 2 as automatically controlled by program plate 6 connected to the projector itself; also, only he can see the answers selected by the individual students, these being displayed on the control panel by means of the student answer displays 1.

The students can see only the correct answer display 4, but at the time the students are making their selections, display 4 is de-actuated by means of a manual switch 10 on the control panel. After all the students have made their selection as to the answer which they believe to be correct to the question projected, the instructor closes switch 10, which connects the student correct answer display 4 in parallel to the instructor correct answer display 2 on the control panel. Only then, can the students view the correct answer to the question projected.

The control panel further includes the following additional manual switches under the control of the instructor: switch 9 which disconnects the student answer display 1 from the power supply; switch 11 which actuates the slide-changer for advancing the next slide, and with it the program plate 6; switch 12 which actuates the focusing mechanism of the projector in one or the other direction; and switch 13 which disconnects the complete system from the power supply.

Further illustrated in the circuit diagram of FIG. 2 are sockets 1a–1n, one for each of the students, which sockets receive plugs from the student selector switches 3; socket 7 connecting the focusing mechanism of the projector to the focusing switch 12 on the control panel; plug 14 receivable in socket 15 to connect the student correct answer display 4 to the instructor correct answer display 2; and socket 16 receiving plug 17 for connecting the microswitches 5 to the instructor correct answer display 2.

The circuit further includes a step-down transformer ST for stepping-down the power supply voltage of 200 volts to 12 volts.

The operation of the apparatus illustrated will be apparent from the foregoing description. First, the slide magazine 8 is loaded with the question-slides in accordance with the desired sequence, and program plate 6 is prepared so as to present a perforation or hole in the appropriate area of the program plate field corresponding to the correct answer for the respective question-slide. The program plate 6 is then attached to the slide magazine with the fields of the program plate in alignment with their respective slides in the magazine, and with the operator arms 5' of the microswitches 5 overlying the program plate so as to be actuated whenever the operator arm senses a hole in the respective field of the program plate corresponding to the slide being projected.

The instructor closes switches 13 and 9, but leaves switch 10 open. He then closes switch 11 which actuates the slide changer to advance one slide into projecting position. The slide projects a question and four multiple-choice answers. The program plate 6 which is also advanced with the slide magazine actuates the one of the four microswitches 5 which corresponds to the correct answer of the slide being projected. This correct answer is transmitted (through plug 17 and socket 16) to the indicator lamps of the correct answer display 2 on the control panel which is viewable only to the instructor.

Each student, upon seeing the question projected by the slide, selects what he thinks is the correct answer by closing the appropriate contacts of his respective switch selector 3. These selections are displayed on the control panel by means of the student answer display 1, and are therefore viewable only by the instructor. The instructor can thus compare the answer selected by each student with the correct answer on display 2.

After all the students have made their selections or after a predetermined time interval has elapsed, the instructor depresses switch 10 which thereby connects the correct answer display 4, viewable by all the students, to the correct answer display 2 on the control panel. Now all the students can compare their respective answers to the correct answer displayed.

After one slide has thus been completed, the instructor depresses switch 11 which actuates the slide-changer to advance the next slide into projecting position. This also automatically advances the program plate 6 which controls the microswitches 5 to designate the correct answer for the next slide to be displayed.

It will be seen that the described apparatus permits a close contact to be maintained between the instructor and all the students individually so that the instructor is always aware of the progress of each student. He can thus regulate the pace of teaching (by controlling the slide-changer) in accordance with the rate of progress of the students. Further, the programmed teaching apparatus illustrated is very simple in construction and therefore can be produced at low cost.

Many changes and variations will be apparent. For example, the program plate could include embossments, depressions, or pegs for actuating the microswitches 5. Alternatively, the microswitches 5 could be replaced by photocell switching devices. Further, the apparatus could include counters which register incorrect (or correct) answers for each student.

Many other changes, variations and applications of the illustrated embodiment will be apparent.

What is claimed is:

1. Programmed teaching apparatus for use with a slide projector for teaching a group of students at one time, comprising: a magazine for holding a plurality of slides in a predetermined sequence, each slide containing a question and a plurality of multiple-choice answers; a plurality of answer selectors one for each student and each manually operable by the student to indicate his selected answer to the question displayed; a control panel including a plurality of student answer displays, one for each student and displaying to the instructor the answers selected by the respective students; a correct answer display disposed on said control panel so as to be viewable only by the instructor; a switching device controlling said correct answer display; and a program plate attached to the magazine so as to be automatically advanced therewith, the program plate including a field for each slide with each field including a plurality of areas recorded in accordance with the correct ones of the multiple-choice answers of the respective slides; whereby the advancement of the magazine controls the switching device to cause the correct answer display to automatically display the correct answer of each slide as it is projected.

2. Programmed teaching apparatus according to claim 1, wherein said control panel further includes a slide-changing manual switch operable by the instructor to advance the slide projector.

3. Programmed teaching apparatus according to claim 1, further including a student correct answer display viewable by the group of students, and a further manual switch on the control panel actuatable by the instructor to selectively connect or disconnect the student correct answer display with respect to the instructor correct answer display.

4. Programmed teaching apparatus according to claim 1, wherein said switching device comprises a plurality of microswitches controlled by said program plate.

5. Programmed teaching apparatus according to claim 1, wherein said areas are recorded by perforations formed in said program plate.

6. Programmed teaching apparatus according to claim 1, wherein said control panel further includes a focussing manual switch operable by the instructor to focus the slide projector.

7. Programmed teaching apparatus according to claim 1, wherein all said displays comprise indicator lamps.

* * * * *